Dec. 17, 1929.  H. E. TUCKER  1,739,876
DRAFT GEAR
Filed July 13, 1928
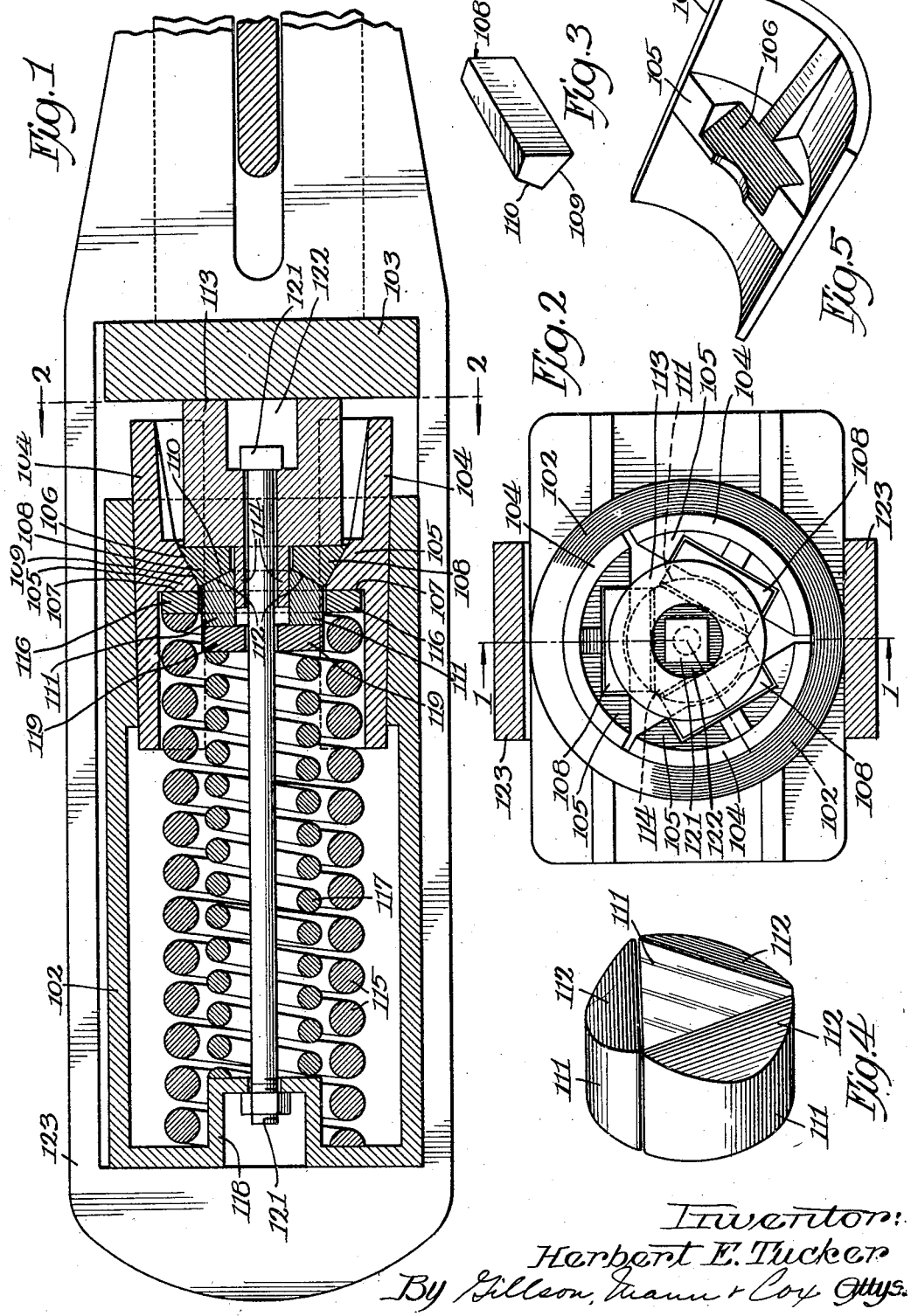
Inventor:
Herbert E. Tucker
By Gillson, Mann + Cox Attys.

Patented Dec. 17, 1929

1,739,876

UNITED STATES PATENT OFFICE

HERBERT E. TUCKER, OF SOUTH BEND, INDIANA, ASSIGNOR TO UNIVERSAL DRAFT GEAR ATTACHMENT CO., A CORPORATION OF ILLINOIS

DRAFT GEAR

Original application filed July 9, 1927, Serial No. 204,618. Divided and this application filed July 13, 1928. Serial No. 292,469.

The invention relates to draft gears of the friction type, and particularly in which there is employed a cylindrical chambered follower or casing within the open end of which the friction elements are housed and with which cooperates an opposing follower which may be in simple plate form.

The objects of the invention are to secure simplicity of construction, reliability and smoothness of action on both compression and release, and to provide improved means for taking up the wear of the parts.

This application is a division of my pending application, Serial No. 204,618, filed July 9, 1927.

A preferred embodiment of the invention is hereinafter described and is illustrated in the accompanying drawings, in which Fig. 1 is a central, vertical, longitudinal section of the gear except as to the friction elements which are viewed on broken line 1—1 of Fig. 2;

Fig. 2 is a view on line 2—2 of Fig. 1; and

Figs. 3, 4 and 5 are views in perspective of various parts of the friction and wedging elements.

The gear comprises a chambered casing 102, shown as seated against the rearward end of a yoke 123 of any preferred form, and a plate follower 103 shown as seated against the forward end of the yoke.

The inner surface of the casing 102 adjacent its longer end is slightly flaring and against it are seated a plurality of friction shoes 104, segmental in form, and as shown, being three in number. Each of these shoes is provided with a transverse rib 105, the inner margin of which is shown as forming a chord of the arc of the outer face of the shoe. The inner faces 107 of these ribs is in the form of a flat shoulder. A spring seat 116 annular in form rests upon these shoulders of the several shoes and the spring 115 reacts between this seat and the inner closed end of the casing 102.

The longitudinal faces of the ribs 105 are inclined forwardly and inwardly, as shown at 106, forming wedging faces which are tangential to arcs struck from the axis of the gear and which cooperate with correspondingly inclined wedging faces 109 on the blocks 108, which are seated against an annular, inwardly facing shoulder normal to the axis of the gear on a thrust element 113 which is seated against the follower 103.

The inner transverse faces 110 of the blocks 108 are inclined forwardly and outwardly but at a more obtuse angle than the faces 109. The inner radial faces of the blocks 108 are preferably parallel with the axis of the gear.

The element 113 has a forwardly extending central stem 114, polygonal in form, the number of its lateral faces corresponding with the number of friction shoes. Seated against these several faces are segmental blocks 111, the rearward faces 112 corresponding to and seated against the faces 110 of the blocks 108. The inner faces of the blocks 111 are flat and normal to the axis of the gear, and against these several blocks rests a circular spring seat 119 between which and the inner end of the casing 102 reacts a spring 117.

For the purpose of holding the parts of the gear in assembled relation before installation, a bolt 121 sets through axial bores in the elements 113 and 119 and the inner end of the casing 102.

Preferably the end of the casing is provided with a central instanding axial boss 118 against which the spring 117 seats and which is externally chambered to form a housing for the nut applied to the end of the bolt 121. Preferably also the element 113 is axially chambered as shown at 122 to form a housing for the head 121 of the bolt.

In operation, in buff, the follower 103 moves backwardly carrying with it the element 113 and the wedge blocks 108. By the cooperation of the wedging faces 106 and 109, the shoes 104 are urged forcibly against the walls of the casing 102, and the blocks 108 are moved inwardly toward the stem 114, wedging forwardly the blocks 111 against the resistance of the spring 117. Farther advance of the follower 103 carries with it the several wedging elements against the resistance of both springs and the frictional resistance between the shoes 104 and the casing 102, this latter resistance gradually augmenting because of the tapering form of the bore of the casing, the shoes 104 being still farther advanced relatively to the other parts of the gear by this wedging action against the resistance of the spring 115.

Both springs are effective in causing the release of the gear and the outer and more powerful spring prevents too sudden release by maintaining intimate wedging contact between the shoes and the blocks 108. The wedging faces of the blocks 111, while quite obtuse, are effective to urge the blocks 108 radially, and, as the parts become worn, take up the slack without appreciably reducing the strength of the spring 117.

The action in draft is the same as in buff, but in the reverse direction.

Various changes may be made within the scope of the invention.

I claim as my invention:

1. In a draft gear, in combination, a chambered follower, an opposed plate follower, shoes frictionally engaging surfaces within the chambered follower and having forwardly and inwardly inclined wedging faces, a pusher element seated on the plate follower and having forwardly facing shoulders normal to the axis of the gear and a forwardly projecting stem having flat walls parallel with the axis of the gear, wedge blocks seated on the shoulders and cooperating with the wedging faces of the shoes and also having inwardly and backwardly inclined faces, wedge blocks cooperating with the last named inclined faces and having flat fans reacting against the walls of the pusher stem, spring means resisting the inward movement of the shoes, and spring means resisting the inward movement of the last named wedge blocks.

2. In a draft gear, in combination, a cylindrical chambered follower, the innes faces of its walls flaring, segmental friction shoes engaging the flaring surfaces of the follower and each having a forwardly and inwardly inclined wedging surface across its inner face, a wedge block cooperating with the wedge surface of each shoe, a thrust element having an annular inner face against which the wedge blocks are seated, and having a central, polygonal, forwardly projecting stem, the faces of which are parallel with the axis of the gear, segmental blocks having inner flat faces engaging the side faces of the stem, the outer end faces of such blocks being forwardly and outwardly inclined at a more obtuse angle to the axis of the gear than the wedging surfaces of the shoes and being seated against similar inclined faces on the wedge blocks, a spring reacting between the shoes and the inner end of the follower, a spring reacting between the segmental blocks and the inner end of the follower, and an opposed follower engaging the thrust element.

In testimony whereof I affix my signature.

HERBERT E. TUCKER.

CERTIFICATE OF CORRECTION.

Patent No. 1,739,876. Granted December 17, 1929, to

HERBERT E. TUCKER.

It is hereby certified that error appears in the printed specification of the above numbered patent requiring correction as follows: Page 2, line 45, claim 1, for the word "fans" read "faces", and line 52, claim 2, for the misspelled word "innes" read "inner"; and that the said Letters Patent should be read with these corrections therein that the same may conform to the record of the case in the Patent Office.

Signed and sealed this 14th day of January, A. D. 1930.

(Seal)

M. J. Moore,
Acting Commissioner of Patents.